United States Patent [19]

Byrns

[11] Patent Number: 4,594,657
[45] Date of Patent: Jun. 10, 1986

[54] SEMAPHORE FOR MEMORY SHARED BY TWO ASYNCHRONOUS MICROCOMPUTERS

[75] Inventor: John P. Byrns, Hoffman Estates, Ill.

[73] Assignee: Motorola, Inc., Schaumburg, Ill.

[21] Appl. No.: 487,777

[22] Filed: Apr. 22, 1983

[51] Int. Cl.$^4$ .............................................. G06F 15/16
[52] U.S. Cl. .................................... 364/200; 364/900
[58] Field of Search ... 364/200 MS File, 900 MS File

[56] References Cited

U.S. PATENT DOCUMENTS

| | | | |
|---|---|---|---|
| 3,919,692 | 11/1975 | Kronies et al. | 340/172.5 |
| 4,096,572 | 6/1978 | Namimoto | 364/200 |
| 4,115,851 | 9/1978 | Nagano | 364/200 |
| 4,145,739 | 3/1979 | Dunning et al. | 364/200 |
| 4,214,304 | 7/1980 | Shimuzu et al. | 364/200 |
| 4,214,305 | 7/1980 | Tokita et al. | 364/200 |
| 4,344,133 | 8/1982 | Bruce et al. | 364/200 |
| 4,379,327 | 4/1983 | Tietjen et al. | 364/200 |
| 4,380,798 | 4/1983 | Shannon et al. | 364/200 |

OTHER PUBLICATIONS

"Intelligent Peripheral Controller-MC68120, MC68121, MC68120-1, MC68121-1", Motorola Semiconductors, 3501 Ed Bluestein Blvd. Austin, Texas 78721-1981.

"Multiprocessing Storage Conflict Resolution Technique" K. A. Duke and B. V. Messina, IBM Technical Disclosure Bulletin, vol. 15, No. 10, pp. 3232-3233.

Primary Examiner—James R. Hoffman
Attorney, Agent, or Firm—Rolland R. Hackbart

[57] ABSTRACT

An improved semaphore is described that arbitrates the access of a memory shared by first and second microcomputers operating asynchronously at the same speed or at different speeds. The semaphore includes a semaphore flip-flop producing a binary semaphore signal indicating whether or not the semaphore is owned, and an ownership flip-flop producing a binary ownership signal indicating which of the first or second microcomputers previously owned the semaphore. First gating circuitry decodes control signals from the first microcomputer and generates a read or write pulse signal. The read pulse signal from the first gating circuitry loads the semaphore signal and ownership signal into first and second flip-flops, respectively, whose outputs are applied to the data bus of the first microcomputer. Second gating circuitry decodes control signals from the second microcomputer and generates a read or write pulse signal. The read pulse signal from the second gating circuitry loads the semaphore signal and ownership signal into third and fourth flip-flops, respectively, whose outputs are applied to the data bus of the second microcomputer. If the first and second microcomputers access the semaphore simultaneously, access is granted to the second microcomputer since the output of the third flip-flop resets the first flip-flop to deny access to the first microcomputer.

11 Claims, 5 Drawing Figures

SEMAPHORE FOR MEMORY SHARED BY TWO ASYNCHRONOUS MICROCOMPUTERS

BACKGROUND OF THE INVENTION

The present invention is related to data processing systems using shared resources, and more particularly to an improved semaphore for controlling the access of a shared memory resource by two or more microcomputers.

The use of shared memory resources for transferring information between two or more microcomputers has become increasingly important due to the wide spread use of distributed processing techniques where control tasks are distributed among a number of microcomputers. A prior art semaphore described in the instant assignee's patent application, Ser. No. 187,259 (U.S. Pat. No. 4,380,798), entitled "Semaphore Register Including Ownership Bits", invented by Paul D. Shannon et al, filed on Sept. 15, 1980, and used in the Motorola Type MC68120/MC68121 Intelligent Peripheral Controller (hereinafter called "IPC"), provides a means of arbitrating so called simultaneous accesses of a shared memory by the IPC microprocessor and a second microprocessor. However, the IPC microprocessor and the second microprocessor must be either operating synchronously or, if operating asynchronously, must be synchronized to one another by means of an additional IPC control signal. Moreover, most commercially available microprocessors, microcomputers and computers are not compatible with the IPC control signals required for asynchronous operation, and therefore, must be operated in synchronism with the IPC microprocessor in order to use the IPC semaphore. But, in many applications, it is desirable to operate multiple processors asynchronously at the same speed or even at different speeds, and at the same time, utilize semaphores for governing simultaneous access of shared memories. However, since prior art semaphores cannot accomodate such asynchronously operating microcomputers or even multiple microprocessors, there is a need for an improved semaphore which can arbitrate the simultaneous access of memory resources shared by two or more asynchronous microcomputers.

OBJECTS AND SUMMARY OF THE INVENTION

Accordingly, it is an object of the present invention to provide an improved semaphore that can arbitrate the simultaneous access of a shared resource by two or more asynchronously operating microcomputers.

It is another object of the present invention to provide an improved semaphore that can arbitrate the simultaneous access of a shared resource by two or more microcomputers operating at different speeds.

It is a further object of the present invention to provide an improved semaphore for use in a data processing system where the access of each of a plurality of resources shared by different pairs of a plurality of microcomputers is controlled by a corresponding improved semaphore of the present invention.

Briefly described, the present invention encompasses a semaphore for a shared resource, such as a memory, that may be simultaneously accessed by first and second microcomputers, or computers. The first and second microcomputers each provide first and second control signals and first and second clock signals, respectively to the semaphore. The semaphore includes an ownership flip-flop for providing an ownership signal having first and second states indicating which of the first and second microcomputers previously owned the shared memory, and a semaphore flip-flop for providing a semaphore signal having first and second states indicating whether or not the shared memory is presently owned by either of the first and second microcomputers. The semaphore further includes first gating circuitry that is coupled to the first microcomputer for generating a first read pulse signal or a first write pulse signal in response to the first control signal and first clock signal. A first flip-flop is coupled to the first gating circuitry and the ownership flip-flop for storing the ownership signal in response to the first read pulse signal. A second flip-flop is coupled to the first gating circuitry and semaphore flip-flop for storing the semaphore signal in response to the first read pulse signal. Second gating circuitry is coupled to the second microcomputer and second clock signal for generating a second read pulse signal or a second write pulse signal in response to the second control signal and second clock signal. Delay circuitry is coupled to the ownership flip-flop for generating a delayed ownership signal. A third flip-flop is coupled to the second gating circuitry and the delay circuitry for storing the delayed ownership signal in response to the second read pulse signal. A fourth flip-flop is coupled to the second gating circuitry and semaphore flip-flop for storing the semaphore signal in response to the second read pulse signal. The fourth flip-flop is further coupled to the first and second flip-flop for causing the first flip-flop to store the second state of the ownership signal and the second flip-flop to store the first state of the semaphore signal in response to the second state of the stored semaphore signal in the fourth flip-flop.

The semaphore flip-flop is further coupled to the first and second gating circuitry for providing the second state of the semaphore signal in response to the first or second write pulse signal, and the first state of the semaphore signal in response to the second state of the stored semaphore signal of the second or fourth flip-flops. The first state of the semaphore signal indicates that the shared memory is owned, and the second state of the semaphore signal indicates that the shared memory is not owned. The ownership flip-flop is further coupled to the second and fourth flip-flops for providing the first state of the ownership signal in response to the second state of the stored semaphore signal in the second flip-flop, and the second state of the ownership signal in response to the second state of the stored semaphore signal in the fourth flip-flop. The first state of the ownership signal indicates that the first microcomputer previously owned the shared memory, and the second state of the ownership signal indicates that the second microcomputer previously owned the shared memory. The semaphore signal and the ownership signal may be multiplexed onto the data bus of the first and second microcomputers by means of analog switches. The semaphore of the present invention can be advantageously utilized in data processing systems for controlling the access of memories which are shared by any two of a number of different microcomputers or computers.

DETAILED DESCRIPTION OF THE PREFERRED EMBODIMENT

Figure 1:
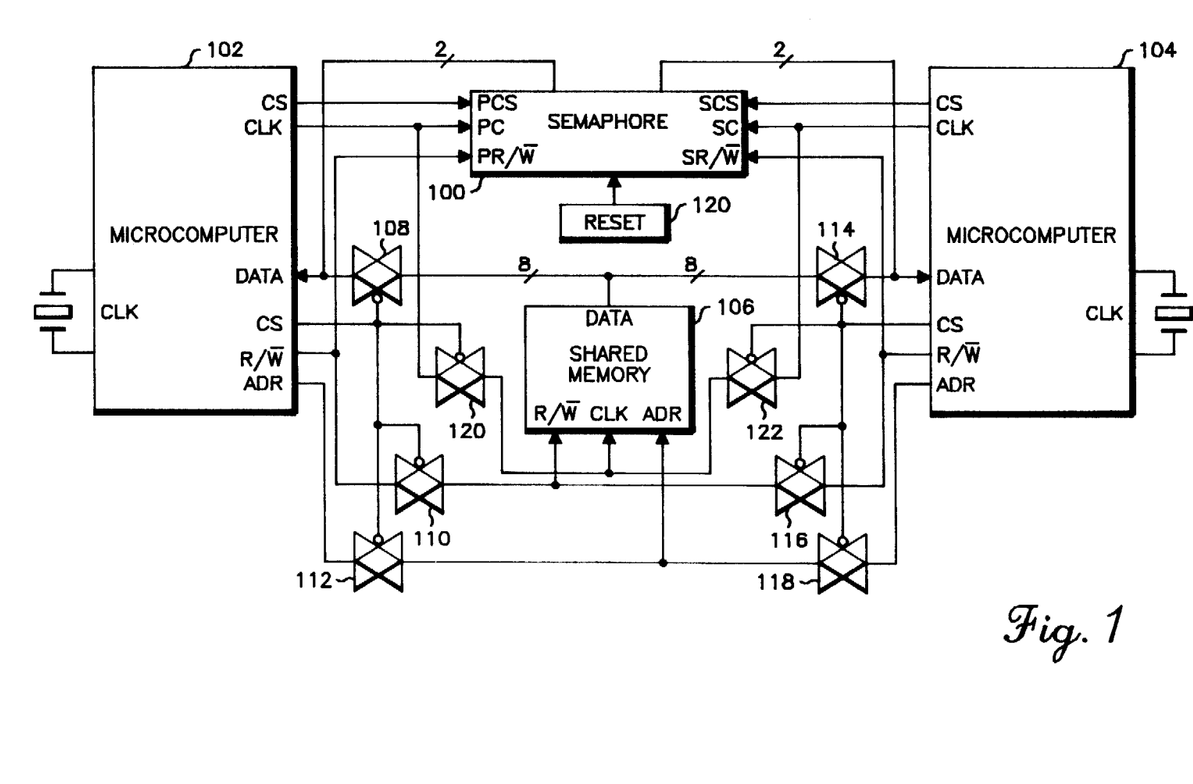
FIG. 1 is a block diagram of a data processing system including the improved semaphore of the present invention.

In FIG. 1, there is illustrated a block diagram of a data processing system including the improved semaphore 100 of the present invention. The data processing system includes microcomputers 102 and 104 which share memory resource 106. Microcomputers 102 and 104 can be any commercially available microprocessors, microcomputers or computers, such as, for example, the Motorola type MC6801 microcomputer. Likewise shared memory 106 can be any suitable commercially available random-access memory, such as, for example, the Motorola type MCM6810, 128×8 bit, random-access memory. The data bus (DATA), address bus (ADR), read/write signal (R/W) and clock signal (CLK) of microcomputer 102 are applied to shared memory 106 by transmission gates 108, 112, 110 and 120, respectively, in response to a control signal (CS) produced by microcomputer 102. Similarly, data bus (DATA), address bus (ADR), read/write control signal (R/W) and clock signal (CLK) of microcomputer 104 are applied to shared memory 106 by analog switches 114, 118, 116 and 122, respectively, in response to a control signal (CS) produced by microcomputer 104. However, if both microcomputer 102 and microcomputer 104 access shared memory 106 at the same time, the data read out of, or written into, shared memory 106 will most likely be inaccurate. In order to prevent errors due to simultaneous access, the semaphore 100 of the present invention is utilized to determine which of the microcomputers 102 or 104 can access shared memory 106.

According to the present invention, semaphore 100 arbitrates the access of shared memory 106 between microcomputers 102 and 104, which may be operating asynchronously at the same speed, or at different speeds. Semaphore 100 is coupled to control signals (SCS and PCS), clock signals (SC and PC) and R/W signals (SR/W and PR/W) from microcomputers 102 and 104. Semaphore 100 produces separate semaphore and ownership signals for microcomputers 102 and 104. The semaphore and ownership signals are coupled to the data bus (SD0–SD6 and PD0–PD6) of microcomputers 102 and 104.

Before accessing shared memory 106, microcomputers 102 and 104 read the state of the semaphore and ownership signals of semaphore 100. In the preferred embodiment, the semaphore signal is a binary signal that has a binary one state for indicating that shared memory 106 is owned and a binary zero state for indicating that shared memory 106 is not owned. The ownership signal is also a binary signal that has a binary one state for indicating that microcomputer 102 previously owned shared memory 106 and a binary zero state for indicating that microcomputer 104 previously owned shared memory 106.

If microcomputer 102 or 104 reads semaphore 100 and find that shared memory 106 is not owned, the microcomputer can then access shared memory 106. When the particular microcomputer 102 or 104 is ready to give up ownership of shared memory 106, the microcomputer writes into semaphore 100, causing the semaphore signal to change state indicating that the shared memory is no longer owned. Reset circuitry 120 is coupled to semaphore 100 for resetting the semaphore and ownership signals to a predetermined state when power is turned on.

Figure 2:
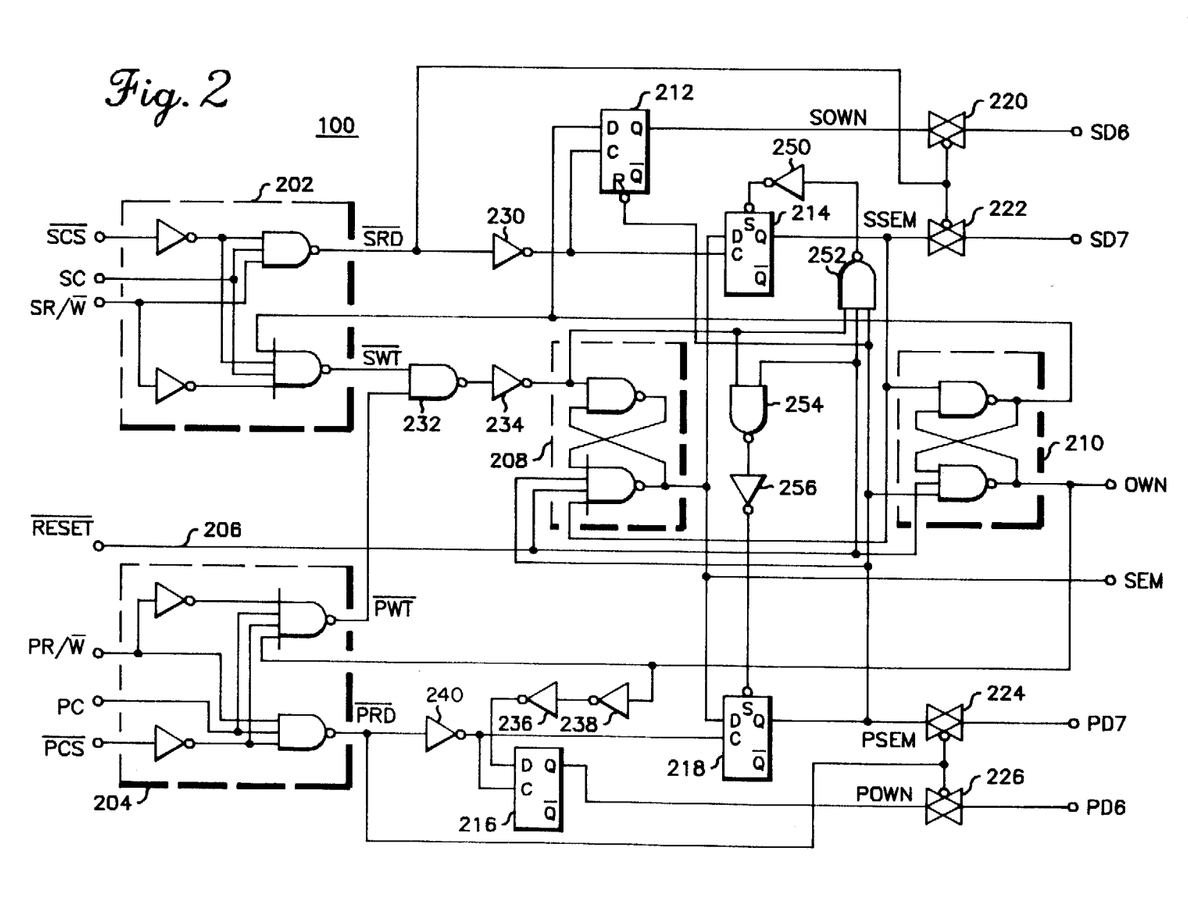
FIG. 2 is a detailed circuit diagram of the semaphore in FIG. 1.

Referring to FIG. 2, there is illustrated a detailed circuit diagram of semaphore 100 in FIG. 1. According to the present invention, semaphore 100 is coupled to a first microcomputer that is designated the supervisor and a second microcomputer that is designated the peripheral microcomputer. In FIG. 1, microcomputer 102 is the supervisor microcomputer, and microcomputer 104 is the peripheral microcomputer. According to a feature of the present invention, if both microcomputers 102 and 104 attempt to access shared memory 106 simultaneously, semaphore 100 grants access to the peripheral microcomputer, which is microcomputer 104 in FIG. 1.

Semaphore 100 in FIG. 2 is coupled to three control signals from the supervisor and peripheral microcomputers and applies semaphore and ownership signals to the data bus of the peripheral and supervisor microcomputers by means of transmission gates 220, 222, 224 and 226. First gating circuitry 202 is coupled to the chip select signal (SCS), clock signal (SC) and read/write signal (SR/W) of the supervisor microcomputers for producing a read pulse signal (SRD) or a write pulse signal (SWT) depending on the binary state of the SR/W signal. Note that the SWT signal is also gated with the complement of the ownership signal from flip-flop 210. The SRD signal enables transmission gates 220 and 222 and also clocks flip-flops 212 and 214 by way of inverting gate 230. The SWT signal is coupled by way of gates 232 and 234 to semaphore flip-flop 208. The semaphore signal (SEM) from flip-flop 208 is reset to a binary zero state in response to the SWT signal. The SEM signal from flip-flop 208 is coupled to the D input of flip-flops 214 and 218. Flip-flops 214 and 218 store the state of the SEM signal from flip-flop 208 in response to the SRD and PRD signals, respectively.

As to the peripheral microcomputer, second gating circuitry 204 in FIG. 2 is coupled to the read/write (PR/W), clock signal (PC) and chip select signal (PCS) from the peripheral microcomputer for producing a read pulse signal (PRD) or a write pulse signal (PWT) depending on the binary state of the PR/W signal. The PWT signal is likewise coupled to gate 232 together with the SWT signal. The PRD signal enables transmission gates 224 and 226 and also clocks flip-flops 216 and 218 by way of inverting gate 240.

Flip-flops 212 and 216 in FIG. 2 store the previous state of the ownership signal (OWN) from flip-flop 210 in response to the SRD signal and PRD signal, respectively. Similarly, flip-flops 214 and 218 store the SEM signal from flip-flop 208 in response to the SRD signal and PRD signal, respectively. The newly stored signals in flip-flops 212 and 214 are applied to the data bus of the supervisor processor by means of transmission gates 220 and 222, respectively, which are enabled by the SRD signal, and the newly stored signals in flip-flops 216 and 218 are applied to the data bus of the peripheral microcomputer by means of transmission gates 226 and 224, respectively, which are enabled by the PRD signal.

The OWN signal from flip-flop 210 in FIG. 2 is coupled by way of inverting gates 236 and 238 to the D input of flip-flop 216. The OWN signal is also coupled to second gating circuitry 204 where it is combined with the PR/W, PC and PCS signals for producing the PWT signal. That is, the PWT signal will only be produced if the OWN signal has a binary one state. The complement of the OWN signal from flip-flop 210 is coupled to the D input of flip-flop 212 and to the first gating circuitry 202 for combination with the SCS, SC and SR/W signals for producing the SWT signal. A reset signal (RESET) 206 is coupled to semaphore flip-flop 208 and ownership flip-flop 210 for producing a binary one state of the SEM signal and a binary one state of the OWN signal at power turn on. The RESET signal 206 is also coupled by way of gates 252 and 250 to the set input of flip-flop 214, and by gating circuitry 254 and 256 to the set input of flip-flop 218, for intializing the state of flip-flops 214 and 218 at power turn on. Gates 252 and 254 are also coupled to the SWT signal or the PWT signal provided by gates 232 and 234. The negative going pulses of the SWT signal and PWT signal reset the SEM signal from flip-flop 208 and also sets flip-flops 214 and 218. This operation prepares the semaphore flip-flop 208 and flip-flops 214 and 218 for subsequent access by either the supervisor or peripheral microcomputers.

According to a further feature of the present invention, semaphore 100 arbitrates simultaneous access by the supervisor and peripheral microcomputers in favor of the peripheral microcomputer by resetting flip-flop 212 and setting flip-flop 214 whenever flip-flop 218 is loaded with a binary zero state of the SEM signal. Loading flip-flop 218 with a binary zero state of the SEM signal indicates that semaphore 100 is available to the peripheral microcomputer, and setting flip-flop 214 to a binary one state indicates that semaphore 100 is not available to the supervisor processor. Since the outputs of flip-flops 210, 214 and 218 may be indeterminate for a short period of time during simultaneous access, gates 236 and 238 are interposed between the OWN signal and the D input of flip-flop 216 to insure that flip-flop 216 is loaded with the proper state of the OWN signal. In other words, gates 236 and 238 provide a delay time period after which the OWN signal from flip-flop 210 has attained a stable state. Depending on the type of logic circuitry used to implement semaphore 100, the necessary delay time interval can be provided by utilizing a suitable number of gates, such as 236 and 238, in the path between the OWN signal and the D input of flip-flop 216.

Figure 3:
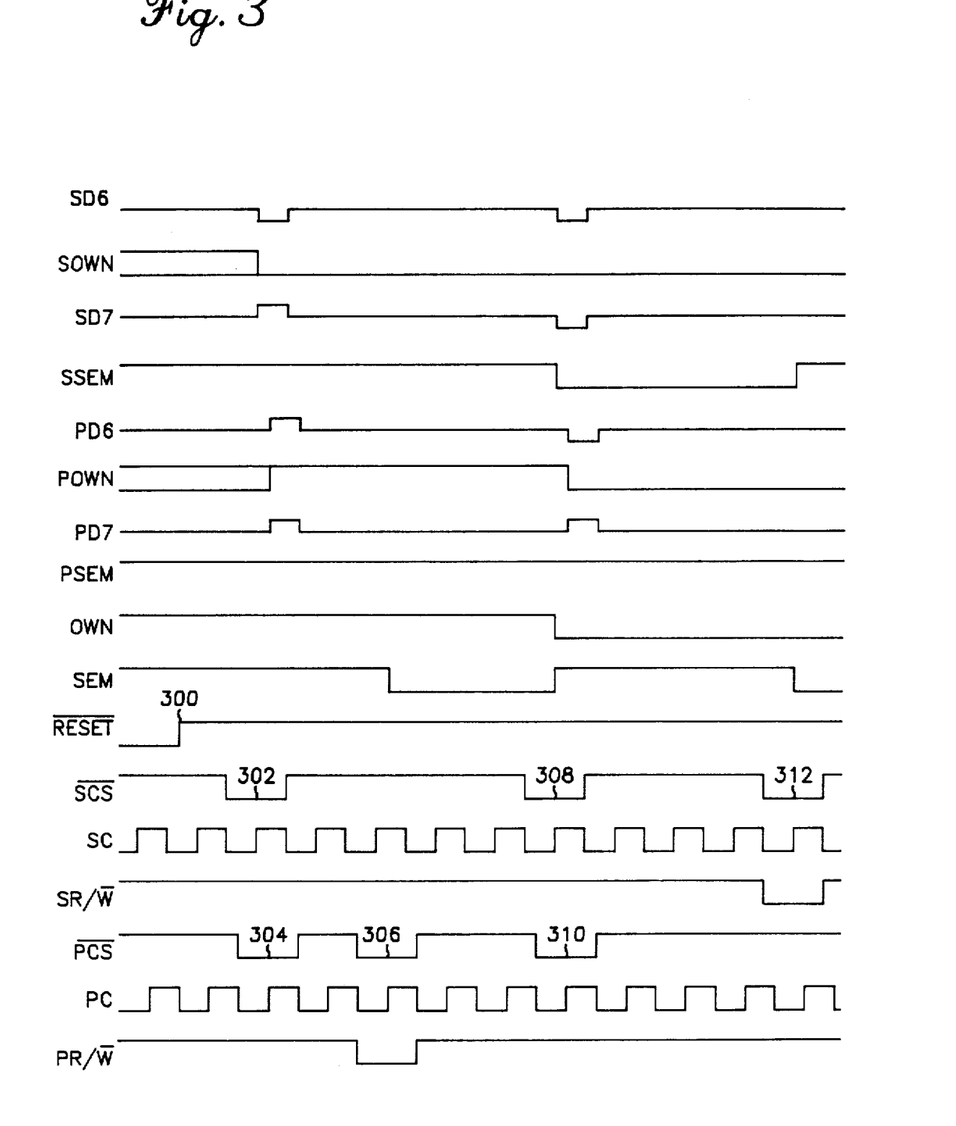
FIG. 3 illustrates the signal waveforms for corresponding parts of the detailed circuit diagram in FIG. 2.

The operation of semaphore 100 in FIG. 2 can be more easily understood by reference to the signal waveforms in FIG. 3. The signal waveforms illustrated in FIG. 3 are the waveforms of signals provided by correspondingly labelled circuit elements in semaphore 100 in FIG. 2. Referring to FIG. 3, at power turn on, the RESET signal has a binary zero state for initializing the SEM, OWN, PSEM, and SSEM signals. At point 300 which is a predetermined time interval after power has been turned on, the RESET signal changes from a binary zero state to a binary one state. Since the OWN signal has a binary one state, the previous owner of semaphore 100 is assumed to be the peripheral microcomputer.

If semaphore 100 is read by either the supervisor microcomputer or the peripheral microcomputer after power turn on, semaphore 100 will indicate that it is presently owned. Thus, the read by the supervisor microcomputer at point 302 and by the peripheral microcomputer at point 304 both indicate that semaphore 100 is presently owned (i.e., SD7=1 and PD7=1). To properly initialize semaphore 100, it is necessary that the peripheral microcomputer write into semaphore 100. The write executed by the peripheral microcomputer at point 306 causes the SEM signal to change from a binary one state to a binary zero state indicating that semaphore 100 is no longer owned. Thereafter, semaphore 100 is available to either the supervisor or the peripheral microcomputer.

Next, at point 308, the supervisor microcomputer reads semaphore 100, and shortly thereafter, at point 310, the peripheral microcomputer reads semaphore 100. Since the read by the supervisor microcomputer precedes the read by the peripheral microcomputer, semaphore 100 grants access to the supervisor microcomputer and denies access to the peripheral microcomputer. That is, the read by the supervisor microcomputer at point 308 produced a binary zero state on its data bus signal SD7 and a binary zero state on its data bus signal SD6, indicating that that semaphore 100 is not presently owned and the peripheral microcomputer previously owned semaphore 100, respectively. The subsequent read by the peripheral microcomputer at point 310 produces a binary one state on its data bus signal PD7 and a binary zero state on its data bus signal PD6 indicating that semaphore 100 is presently owned and that the owner is the supervisor microcomputer, respectively. The supervisor microcomputer may now read shared memory 106 and/or write into shared memory 106. When the supervisor processor has completed data transfers to/from shared memory 106, the supervisor microcomputer writes into semaphore 100 at point 312. The write by supervisor microcomputer at point 312 causes the SEM signal to change from a binary one state to a binary zero state and causes the SSEM signal to change from a binary zero to a binary one state. The binary state of the SEM signal now indicates that semaphore 100 is not owned, and the binary zero state of the OWN signal indicates that semaphore 100 was previously owned by the supervisor microcomputer. The next microcomputer to read semaphore 100 will be granted access of shared memory 106 to the exclusion of the other microcomputer.

The logic circuit elements of semaphore 100 in FIG. 2 may be mechanized by utilizing the circuit elements in conventional integrated circuit devices, such as, for example, the CMOS integrated circuits described in the "CMOS Integrated Circuits Book", published by Motorola Semiconductor Products, Inc., Austin, Tex. 1978. Furthermore, the logic circuit elements of semaphore 100 in FIG. 2 can be readily integrated into a semiconductive substrate, such that one or more semaphores of the present invention can be provided in a single integrated circuit device. In fact, both semaphore 100 and shared memory 106 together with transmission gates 108, 110, 112, 114, 116, 118, 120 and 122 can be integrated into the same semiconductive substrate.

Figure 4:
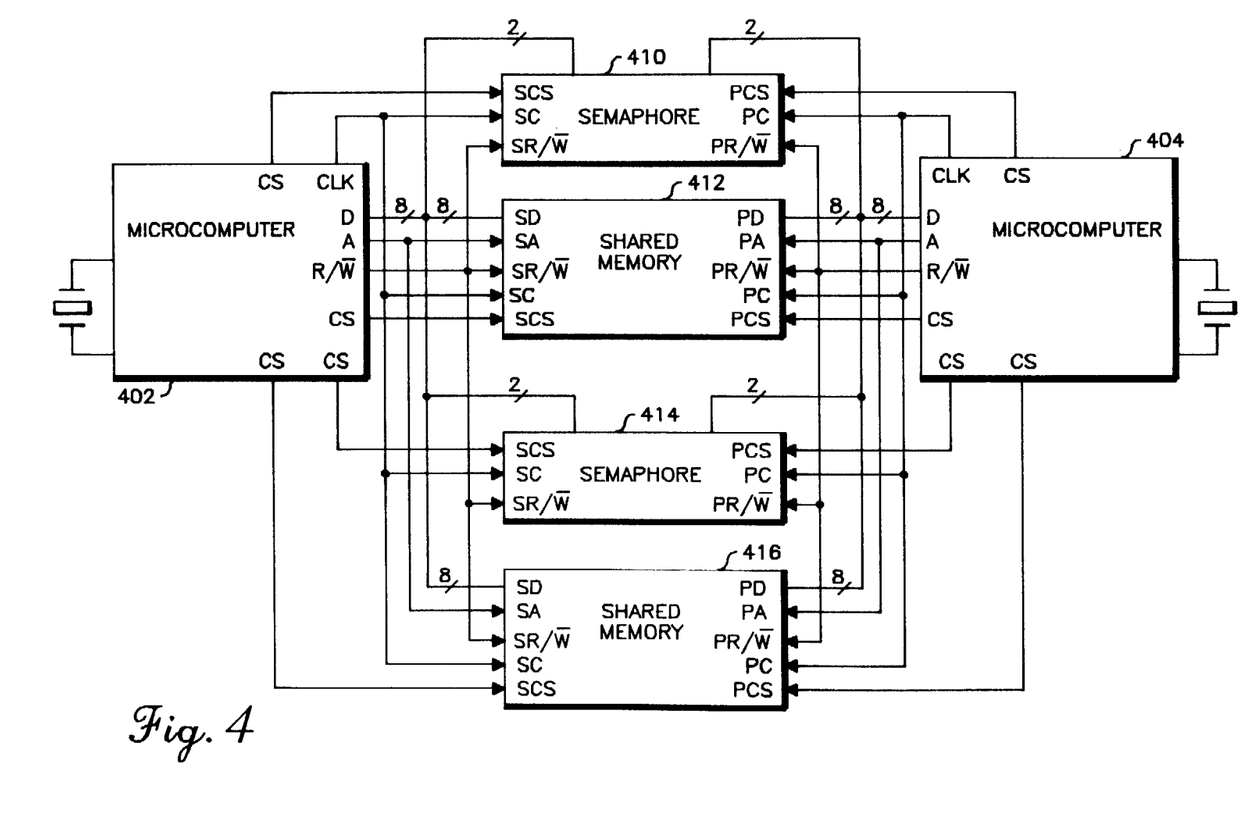
FIG. 4 is a block diagram of a data processing system utilizing two semaphores of the present invention for arbitrating the access of two corresponding memories between two microcomputers.
Figure 5:
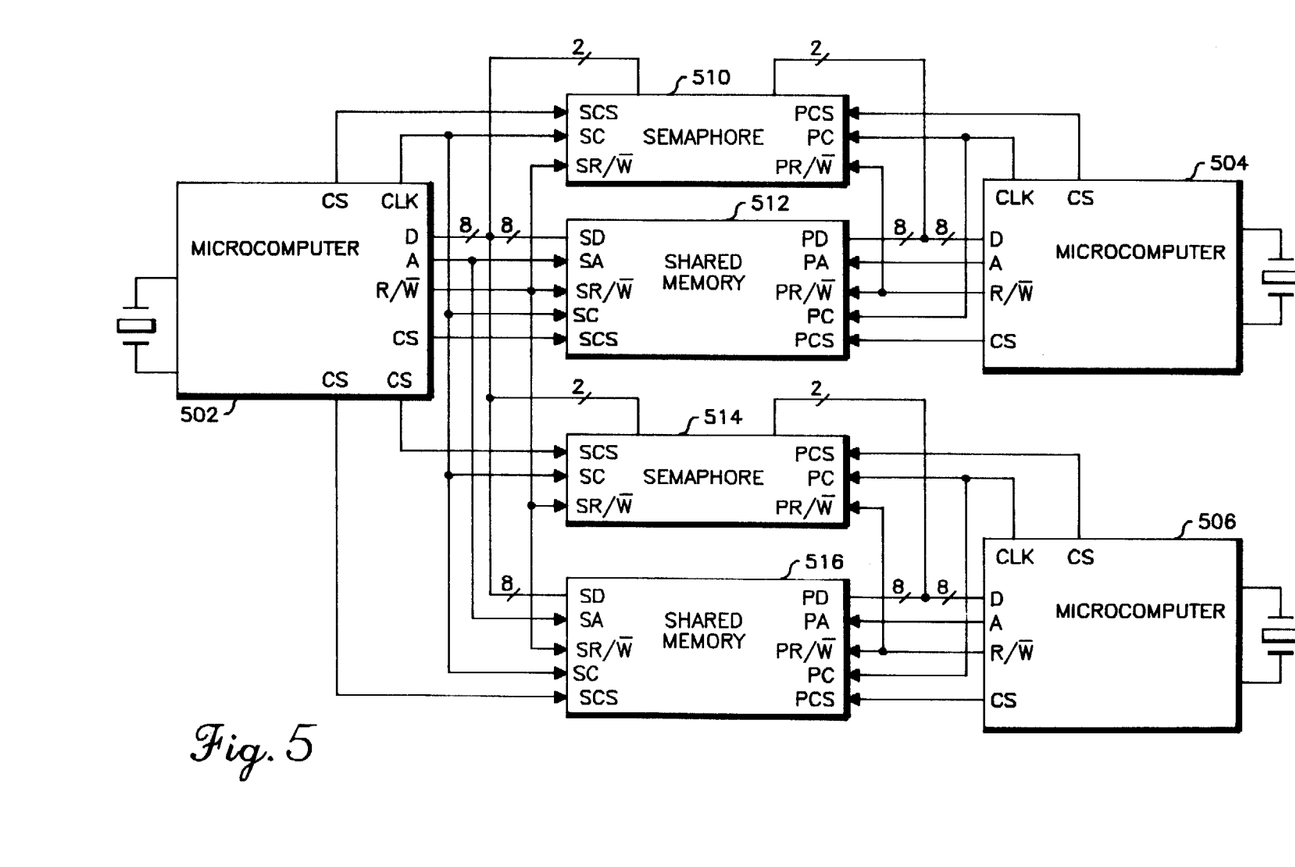
FIG. 5 is a block diagram of a data processing system utilizing two semaphores of the present invention for arbitrating the access of two corresponding memories shared by two of three microcomputers.

Referring to FIGS. 4 and 5, there is illustrated two different data processing systems utilizing multiple semaphores of the present invention. In FIG. 4, microcomputers 402 and 404 access shared memories 412 and 416 under control of semaphores 410 and 414, respectively. Shared memories 412 and 416 are substantially the same as shared memory 106 combined with transmission gates 108, 110, 112, 114, 116, 118, 120 and 122 in FIG. 1.

In FIG. 5, microcomputers 502 and 504 access shared memory 512 under control of semaphore 510, and microcomputers 502 and 506 access shared memory 516 under control of semaphore 514. According to an important feature of the present invention, microcomputers 502, 504 and 506 can be operating asynchronously at different speeds. Furthermore, microcomputers 504 and 506 can access additional memories shared with each other or with other microcomputers by utilizing another semaphore of the present invention for each additional memory.

In summary, an improved semaphore for arbitrating the access of a shared memory resource by two asynchronously operating microcomputers has been described. Simultaneous reads of the semaphore by both microcomputers results in granting of access to a predetermined one of the microcomputers. According to an important feature of the improved semaphore of the present invention, both microcomputers can be operating asynchronously at the same speed or at different speeds. Furthermore, each of the two microcomputers can also be coupled to additional semaphores for controlling access to additional memory resources shared by the two microcomputers or by one of the microcomputers and a third microcomputer. The improved semaphore of the present invention can be advantageously utilized in any data processing system where one or more resources are shared by different pairs of microcomputers, microprocessors or computers.

I claim:

1. Semaphore circuitry for resource means shared by first and second processing means generating first and second control signals and coupled to first and second clock signals from first and second signal sources, respectively, said semaphore circuitry comprising:
   first gating means coupled to the first processing means and first clock signal source for generating a first read pulse signal or a first write pulse signal in response to the first control signal and first clock signal;
   first storage means coupled to the first gating means and an ownership signal for storing the ownership signal in response to the first read pulse signal;
   second storage means coupled to the first gating means and a semaphore signal for storing the semaphore signal in response to the first read pulse signal;
   second gating means coupled to the second processing means and second clock signal source for generating a second read pulse signal or a second write pulse signal in response to the second control signal and second clock signal;
   delay means coupled to the ownership signal for generating a delayed ownership signal;
   third storage means coupled to the second gating means and delay means for storing the delayed ownership signal in response to the second read pulse signal;
   fourth storage means coupled to the second gating means and the semaphore signal for storing the semaphore signal in response to the second read pulse signal;
   semaphore means coupled to the first and second gating means and the second and fourth storage means for producing the semaphore signal, said semaphore signal having a first state in response to a second state of the stored semaphore signal in the second or fourth storage means, and having a second state in response to the first or second write pulse signal, where the first state of the semaphore signal indicates that the shared resource means is owned by the first or second processing means and the second state of the semaphore signal indicates that the shared resource means is not owned by either the first or second processing means;
   ownership means coupled to the second and fourth storage means for producing the ownership signal, said ownership signal having a first state in response to a second state of the stored semaphore signal in the fourth storage means and having a second state in response to the second state of the stored semaphore signal in the second storage means, where the first state of the ownership signal indicates that the shared resource means is owned by the second processing means and the second state of the ownership signal indicates that the shared resource means is owned by the first processing means; and
   the fourth storage means further being coupled to the first and second storage means for causing the first storage means to store the second state of the ownership signal and the second storage means to store the first state of the semaphore signal in response to the second state of the stored semaphore signal in the fourth storage means.

2. The semaphore circuitry according to claim 1, further including means for generating a reset signal, said semaphore means being coupled to the reset means for providing the first state of the semaphore signal in response to the reset signal, said ownership means being coupled to the reset means for providing the first state of the ownership signal in response to the reset signal, said second storage means being coupled to the reset means for providing the first state of the stored semaphore signal in response to the reset signal, and said fourth storage means being coupled to the reset means for providing the first state of the stored semaphore signal in response to the reset signal.

3. The first and second semaphore circuitry according to claim 1, further including:
   first data bus means coupled to the first processing means;
   second data bus means coupled to the second processing means; and
   said semaphore circuitry further including:
   first and second switching means coupled to the first and second storage means for applying the stored ownership signal and stored semaphore signal therein, respectively, to the first data bus means in response to the first read pulse signal; and
   third and fourth switching means coupled to the third and fourth storage means for applying the stored ownership signal and stored semaphore signal therein, respectively, to the second data bus means in response to the second read pulse signal.

4. The semaphore circuitry according to claim 1, further including second semaphore circuitry for second resource means shared by the first and second processing means, the first and second processing means further generating third and fourth control signals, respectively, said second semaphore circuitry comprising:
  first gating means coupled to the first processing means and first clock signal source for generating a first read pulse signal or a first write pulse signal in response to the third control signal and first clock signal;
  first storage means coupled to the first gating means and an ownership signal for storing the ownership signal in response to the first read pulse signal;
  second storage means coupled to the first gating means and a semaphore signal for storing the semaphore signal in response to the first read pulse signal;
  second gating means coupled to the second processing means and second clock signal source for generating a second read pulse signal or a second write pulse signal in response to the fourth control signal and second clock signal;
  delay means coupled to the ownership signal for generating a delayed ownership signal;
  third storage means coupled to the second gating means and delay means for storing the delayed ownership signal in response to the second read pulse signal;
  fourth storage means coupled to the second gating means and the semaphore signal for storing the semaphore signal in response to the second read pulse signal;
  semaphore means coupled to the first and second gating means and the second and fourth storage means for producing the semaphore signal, said semaphore signal having a first state in response to a second state of the stored semaphore signal in the second or fourth storage means, and having a second state in response to the first or second write pulse signal, where the first state of the semaphore signal indicates that the second shared resource means is owned by the first or second processing means and the second state of the semaphore signal indicates that the second shared resource means is not owned by either the first or second processing means;
  ownership means coupled to the second and fourth storage means for producing the ownership signal, said ownership signal having a first state in response to a second state of the stored semaphore signal in the fourth storage means and having a second state in response to the second state of the stored semaphore signal in the second storage means, where the first state of the ownership signal indicates that the second shared resource means is owned by the second processing means and the second state of the ownership signal indicates that the second shared resource means is owned by the first processing means; and
  the fourth storage means further being coupled to the first and second storage means for causing the first storage means to store the second state of the ownership signal and the second storage means to store the first state of the semaphore signal in response to the second state of the stored semaphore signal in the fourth storage means.

5. The semaphore circuitry according to claim 4, further including means for generating a reset signal; and wherein, for said first and second semaphore circuitry, said semaphore means is coupled to the reset means for providing the first state of the semaphore signal in response to the reset signal, said ownership means is coupled to the reset means for providing the first state of the ownership signal in response to the reset signal, said second storage means is coupled to the reset means for providing the first state of the stored semaphore signal in response to the reset signal, and said fourth storage means is coupled to the reset means for providing the first state of the stored semaphore signal in response to the reset signal.

6. The first and second semaphore circuitry according to claim 4, further including:
  first data bus means coupled to the first processing means;
  second data bus means coupled to the second processing means; and
  said first and second semaphore circuitry each further including:
  first and second switching means coupled to the first and second storage means for applying the stored ownership signal and stored semaphore signal therein, respectively, to the first data bus means in response to the first read pulse signal; and
  third and fourth switching means coupled to the third and fourth storage means for applying the stored ownership signal and stored semaphore signal therein, respectively, to the second data bus means in response to the second read pulse signal.

7. The semaphore circuitry according to claim 1, further including third processing means and second semaphore circuitry for second resource means shared by the first and third processing means, the first and third processing means generating third and fourth control signals, respectively, and the third processing means being coupled to a third clock signal from a third signal source, said second semaphore circuitry comprising:
  first gating means coupled to the first processing means and first clock signal source for generating a first read pulse signal or a first write pulse signal in response to the third control signal and first clock signal;
  first storage means coupled to the first gating means and an ownership signal for storing the ownership signal in response to the first read pulse signal;
  second storage means coupled to the first gating means and a semaphore signal for storing the semaphore signal in response to the first read pulse signal;
  second gating means coupled to the third processing means and third clock signal source for generating a second read pulse signal or a second write pulse signal in response to the fourth control signal and third clock signal;
  delay means coupled to the ownership signal for generating a delayed ownership signal;
  third storage means coupled to the second gating means and delay means for storing the delayed ownership signal in response to the second read pulse signal;
  fourth storage means coupled to the second gating means and the semaphore signal for storing the semaphore signal in response to the second read pulse signal;

semaphore means coupled to the first and second gating means and the second an fourth storage means for producing the semaphore signal, said semaphore signal having a first state in response to a second state of the stored semaphore signal in the second or fourth storage means, and having a second state in response to the first or second write pulse signal, where the first state of the semaphore signal indicates that the second shared resource means is owned by the first or third processing means and the second state of the semaphore signal indicates that the second shared resource means is not owned by either the first or third processing means;

ownership means coupled to the second and fourth storage means for producing the ownership signal, said ownership signal having a first state in response to a second state of the stored semaphore signal in the fourth storage means and having a second state in response to the second state of the stored semaphore signal in the second storage means, where the first state of the ownership signal indicates that the second shared resource means is owned by the third processing means and the second state of the ownership signal indicates that the second shared resource means is owned by the first processing means; and the fourth storage means further being coupled to the first and second storage means for causing the first storage means to store the second state of the ownership signal and the second storage means to store the first state of the semaphore signal in response to the second state of the stored semaphore signal in the fourth storage means.

8. The semaphore circuitry according to claim 7, further including means for generating a reset signal; and wherein, for said first and second semaphore circuitry, said semaphore means is coupled to the reset means for providing the first state of the semaphore signal in response to the reset signal, said ownership means is coupled to the reset means for providing the second state of the ownership signal in response to the reset signal, said second storage means is coupled to the reset means for providing the first state of the stored semaphore signal in response to the reset signal, and said fourth storage means is coupled to the reset means for providing the first state of the stored semaphore signal in response to the reset signal.

9. The first and second semaphore circuitry according to claim 7, further including:

first data bus means coupled to the first processing means;

second data bus means coupled to the second processing means;

third data bus means coupled to the third processing means;

said first semaphore circuitry further including:

first and second switching means coupled to the first and second storage means for applying the stored ownership signal and stored semaphore signal therein, respectively, to the first data bus means in response to the first read pulse signal; and third and fourth switching means coupled to the third and fourth storage means for applying the stored ownership signal and stored semaphore signal therein, respectively, to the second data bus means in response to the second read pulse signal; and said second semaphore circuitry further including:

first and second switching means coupled to the first and second storage means for applying the stored ownership signal and stored semaphore signal therein, respectively, to the first data bus means in response to the first read pulse signal; and third and fourth switching means coupled to the third and fourth storage means for applying the stored ownership signal and stored semaphore signal therein, respectively, to the third data bus means in response to the second read pulse signal.

10. Semaphore circuitry for a resource shared by first and second computers generating first and second control signals and coupled to first and second clock signals from first and second signal sources, respectively, said semaphore circuitry comprising:

first gating circuitry coupled to the first computer and first clock signal source for generating a first read pulse signal or a first write pulse signal in response to the first control signal and first clock signal;

a first flip-flop coupled to the first gating circuitry and an ownership signal for storing the ownership signal in response to the first read pulse signal;

a second flip-flop coupled to the first gating circuitry and a semaphore signal for storing the semaphore signal in response to the first read pulse signal;

second gating circuitry coupled to the second computer and second clock signal source for generating a second read pulse signal or a second write pulse signal in response to the second control signal and second clock signal;

delay circuitry coupled to the ownership signal for generating a delayed ownership signal;

a third flip-flop coupled to the second gating circuitry and delay circuitry for storing the delayed ownership signal in response to the second read pulse signal;

a fourth flip-flop coupled to the second gating circuitry and the semaphore signal for storing the semaphore signal in response to the second read pulse signal;

a semaphore flip-flop coupled to the first and second gating circuitry and the second and fourth flip-flops for producing the semaphore signal, said semaphore signal having a first state in response to a second state of the stored semaphore signal in the second or fourth flip-flop, and having a second state in response to the first or second write pulse signal, where the first state of the semaphore signal indicates that the shared resource is owned by the first or second computer and the second state of the semaphore signal indicates that the shared resource is not owned by either the first or second computer;

an ownership flip-flop coupled to the second and fourth flip-flop for producing the ownership signal, said ownership signal having a first state in response to a second state of the stored semaphore signal in the fourth flip-flop and having a second state in response to the second state of the stored semaphore signal in the second flip-flop, where the first state of the ownership signal indicates that the shared resource is owned by the second computer and the second state of the ownership signal indicates that the shared resource means is owned by the first computer; and said fourth flip-flop further being coupled to the first and second flip-flop for causing the first flip-flop to store the second state of the ownership signal and the second flip-flop to store the first state of the semaphore signal in response to the second state of the stored semaphore signal in the fourth flip-flop.

11. A method for use in semaphore circuitry for resource means shared by first and second processing means generating first and second control signals and coupled to first and second clock signals from first and second signal sources, respectively, said method comprising the steps of:

generating a first read pulse signal or a first write pulse signal in response to the first control signal and first clock signal;

storing an ownership signal in first storage means in response to the first read pulse signal;

storing a semaphore signal in second storage means in response to the first read pulse signal;

generating a second read pulse signal or a second write pulse signal in response to the second control signal and second clock signal;

generating a delayed ownership signal;

storing the delayed ownership signal in third storage means in response to the second read pulse signal;

storing the semaphore signal in fourth storage means in response to the second read pulse signal;

producing a first state of the semaphore signal in response to a second state of the stored semaphore signal in the second or fourth storage means, and a second state of the semaphore signal in response to the first or second write pulse signal, where the first state of the semaphore signal indicates that the shared resource means is owned by the first or second processing means and the second state of the semaphore signal indicates that the shared resource means is not owned by either the first or second processing means;

producing a first state of the ownership signal in response to a second state of the stored semaphore signal in the fourth storage means and a second state of the ownership signal in response to the second state of the stored semaphore signal in the second storage means, where the first state of the ownership signal indicates that the shared resource means is owned by the second processing means and the second state of the ownership signal indicates that the shared resource means is owned by the first processing means; and causing the first storage means to store the second state of the ownership signal and the second storage means to store the first state of the semaphore signal in response to the second state of the stored semaphore signal in the fourth storage means.

* * * * *